US012120778B2

(12) United States Patent
Clemens et al.

(10) Patent No.: US 12,120,778 B2
(45) Date of Patent: Oct. 15, 2024

(54) AEROSOL DELIVERY DEVICE INCLUDING A CERAMIC WICKING ELEMENT

(71) Applicant: RAI STRATEGIC HOLDINGS, INC., Winston-Salem, NC (US)

(72) Inventors: David A. Clemens, Chapel Hill, NC (US); William Kevin Carpenter, Warrensville, NC (US); Michael F. Davis, Clemmons, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 0 days.

(21) Appl. No.: 17/832,262

(22) Filed: Jun. 3, 2022

(65) Prior Publication Data

US 2022/0322740 A1 Oct. 13, 2022

Related U.S. Application Data

(60) Continuation of application No. 16/375,253, filed on Apr. 4, 2019, now Pat. No. 11,382,179, which is a division of application No. 15/499,185, filed on Apr. 27, 2017, now Pat. No. 10,285,444.

(51) Int. Cl.

*A24F 13/00* (2006.01)
*A24F 40/40* (2020.01)
*A24F 40/44* (2020.01)
*H05B 1/02* (2006.01)
*A24F 40/10* (2020.01)
*A24F 40/485* (2020.01)

(52) U.S. Cl.

CPC ........... *H05B 1/0244* (2013.01); *A24F 40/40* (2020.01); *A24F 40/44* (2020.01); *A24F 40/10* (2020.01); *A24F 40/485* (2020.01); *H05B 2203/021* (2013.01)

(58) Field of Classification Search

CPC ........................................................ A24F 47/00
USPC .................................................. 131/328–329
See application file for complete search history.

(56) References Cited

U.S. PATENT DOCUMENTS

| | | | |
|---|---|---|---|
| 2,057,353 | A | 10/1936 | Whittemore, Jr. |
| 2,104,266 | A | 1/1938 | McCormick |
| 3,200,819 | A | 8/1965 | Gilbert |

(Continued)

FOREIGN PATENT DOCUMENTS

| | | |
|---|---|---|
| CN | 1541577 | 11/2004 |
| CN | 2719043 | 8/2005 |

(Continued)

OTHER PUBLICATIONS

KR Notice of Allowance dated Sep. 27, 2023 from related KR Patent Application No. 2019-7033267; 4 pages.

(Continued)

*Primary Examiner* — Phuong K Dinh
(74) *Attorney, Agent, or Firm* — WOMBLE BOND DICKINSON (US) LLP

(57) ABSTRACT

The present disclosure relates to aerosol delivery devices, methods of forming such devices, and elements of such devices. In some embodiments, the present disclosure provides vapor-forming units for aerosol delivery devices, the vapor-forming units including a ceramic wick that is in contact with a heater and in contact with an aerosol precursor composition. The vapor-forming units are connectable to a power unit.

17 Claims, 11 Drawing Sheets

(56) References Cited

U.S. PATENT DOCUMENTS

| | | | | |
|---|---|---|---|---|
| 4,922,901 | A | 5/1990 | Brooks et al. | |
| 5,060,671 | A | 10/1991 | Counts et al. | |
| 5,093,894 | A | 3/1992 | Deevi et al. | |
| 5,261,424 | A | 11/1993 | Sprinkel, Jr. | |
| 5,388,574 | A | 2/1995 | Ingebrethsen et al. | |
| 5,530,225 | A | 6/1996 | Hajaligol | |
| 5,687,746 | A | 11/1997 | Rose et al. | |
| 5,726,421 | A | 3/1998 | Fleischhauer et al. | |
| 5,865,185 | A | 2/1999 | Collins et al. | |
| 5,894,841 | A | 4/1999 | Voges | |
| 6,125,853 | A | 10/2000 | Susa et al. | |
| 6,155,268 | A | 12/2000 | Takeuchi | |
| 7,117,867 | B2 | 10/2006 | Cox et al. | |
| 7,832,410 | B2 | 11/2010 | Hon | |
| 8,314,591 | B2 | 11/2012 | Terry et al. | |
| 8,365,742 | B2 | 2/2013 | Hon | |
| 8,499,766 | B1 | 8/2013 | Newton | |
| 8,528,569 | B1 | 9/2013 | Newton | |
| 9,326,547 | B2 | 5/2016 | Tucker et al. | |
| 9,603,387 | B2 * | 3/2017 | Liu .......................... | H05B 3/03 |
| 10,028,532 | B2 | 7/2018 | Zhu | |
| 10,136,675 | B2 | 11/2018 | Li et al. | |
| 11,291,254 | B2 | 4/2022 | Worm et al. | |
| 11,666,090 | B2 | 6/2023 | Reevell | |
| 2005/0016550 | A1 | 1/2005 | Katase | |
| 2006/0196518 | A1 | 9/2006 | Hon | |
| 2008/0092912 | A1 | 4/2008 | Robinson et al. | |
| 2009/0095311 | A1 | 4/2009 | Hon | |
| 2009/0126745 | A1 | 5/2009 | Hon | |
| 2009/0188490 | A1 | 7/2009 | Hon | |
| 2009/0272379 | A1 | 11/2009 | Thorens et al. | |
| 2009/0320863 | A1 | 12/2009 | Fernando et al. | |
| 2011/0094523 | A1 | 4/2011 | Thorens et al. | |
| 2011/0126848 | A1 | 6/2011 | Zuber et al. | |
| 2011/0155718 | A1 | 6/2011 | Greim et al. | |
| 2011/0168194 | A1 | 7/2011 | Hon | |
| 2011/0265806 | A1 | 11/2011 | Alarcon et al. | |
| 2011/0290248 | A1 | 12/2011 | Schennum | |
| 2012/0111347 | A1 | 5/2012 | Hon | |
| 2012/0260927 | A1 | 10/2012 | Liu | |
| 2012/0279512 | A1 | 11/2012 | Hon | |
| 2013/0037041 | A1 | 2/2013 | Worm et al. | |
| 2013/0042865 | A1 | 2/2013 | Monsees et al. | |
| 2013/0056013 | A1 | 3/2013 | Terry et al. | |
| 2013/0220315 | A1 | 8/2013 | Conley et al. | |
| 2013/0306084 | A1 | 11/2013 | Flick | |
| 2013/0319435 | A1 | 12/2013 | Flick | |
| 2013/0319438 | A1 | 12/2013 | Liu | |
| 2014/0000638 | A1 | 1/2014 | Sebastian et al. | |
| 2014/0060554 | A1 | 3/2014 | Collett et al. | |
| 2014/0060555 | A1 | 3/2014 | Chang et al. | |
| 2014/0096781 | A1 | 4/2014 | Sears et al. | |
| 2014/0096782 | A1 | 4/2014 | Ampolini et al. | |
| 2014/0109921 | A1 | 4/2014 | Chen | |
| 2014/0209105 | A1 | 7/2014 | Sears et al. | |
| 2014/0253144 | A1 | 9/2014 | Novak et al. | |
| 2014/0261408 | A1 | 9/2014 | DePiano et al. | |
| 2014/0261486 | A1 | 9/2014 | Potter et al. | |
| 2014/0261487 | A1 | 9/2014 | Chapman et al. | |
| 2014/0261495 | A1 | 9/2014 | Novak et al. | |
| 2014/0270727 | A1 | 9/2014 | Ampolini et al. | |
| 2014/0270729 | A1 | 9/2014 | DePiano et al. | |
| 2014/0270730 | A1 | 9/2014 | DePiano et al. | |
| 2015/0059787 | A1 | 3/2015 | Qiu | |
| 2015/0128976 | A1 | 5/2015 | Verleur et al. | |
| 2015/0313275 | A1 | 11/2015 | Anderson et al. | |
| 2015/0327596 | A1 | 11/2015 | Alarcon et al. | |
| 2016/0135505 | A1 * | 5/2016 | Li ............................ | H05B 3/44<br>131/329 |
| 2016/0374399 | A1 | 12/2016 | Monsees et al. | |
| 2017/0006922 | A1 | 1/2017 | Wang et al. | |
| 2017/0273359 | A1 | 9/2017 | Liu | |
| 2018/0042306 | A1 | 2/2018 | Atkins et al. | |
| 2018/0199630 | A1 | 7/2018 | Qiu | |

FOREIGN PATENT DOCUMENTS

| | | | | |
|---|---|---|---|---|
| CN | 201379072 | | | 1/2010 |
| CN | 203416813 | | | 2/2014 |
| CN | 204191595 | U | | 3/2015 |
| CN | 204217918 | | | 3/2015 |
| CN | 204499484 | | | 7/2015 |
| CN | 105795522 | | | 7/2016 |
| CN | 205794803 | | | 12/2016 |
| EP | 0 295 122 | | | 12/1988 |
| EP | 0 845 220 | | | 6/1998 |
| EP | 1 618 803 | | | 1/2006 |
| EP | 2 801 271 | | | 11/2014 |
| EP | 3 015 010 | | | 5/2016 |
| EP | 3 020 292 | | | 5/2016 |
| EP | 3 039 976 | | | 7/2016 |
| GB | 2469850 | | | 11/2010 |
| JP | 2015505476 | A | | 2/2015 |
| JP | 2017532009 | A | | 11/2017 |
| JP | WO 2017/187545 | | * | 11/2017 |
| JP | 2019520043 | A | | 7/2019 |
| WO | WO 95/01137 | | | 1/1995 |
| WO | WO 2003/034847 | | | 5/2003 |
| WO | WO 2004/080216 | | | 9/2004 |
| WO | WO 2005/099494 | | | 10/2005 |
| WO | WO 2007/131449 | | | 11/2007 |
| WO | WO2016161554 | | | 10/2016 |
| WO | WO 2017/031678 | | | 3/2017 |
| WO | WO 2017/045899 | | | 3/2017 |

OTHER PUBLICATIONS

JP Office Action dated Sep. 5, 2023 from related JP Patent Application No. 2022-162924 filed Oct. 11, 2022; 7 pages.

* cited by examiner

AEROSOL DELIVERY DEVICE INCLUDING A CERAMIC WICKING ELEMENT

CROSS-REFERENCE TO RELATED APPLICATIONS

The present application is a continuation of U.S. patent application Ser. No. 16/375,253, filed Apr. 4, 2019, which is a divisional of U.S. patent application Ser. No. 15/499,185, filed Apr. 27, 2017, now U.S. Pat. No. 10,285,444, the disclosures of which are incorporated herein by reference in their entirety.

FIELD OF THE DISCLOSURE

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from tobacco or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices, and heat generating sources set forth in the background art described in U.S. Pat. No. 7,726,320 to Robinson et al., U.S. Pat. Pub. No. 2013/0255702 to Griffith Jr. et al., and U.S. Pat. Pub. No. 2014/0096781 to Sears et al., which are incorporated herein by reference. See also, for example, the various types of smoking articles, aerosol delivery devices, and electrically powered heat generating sources referenced by brand name and commercial source in U.S. patent application Ser. No. 14/170,838 to Bless et al., filed Feb. 3, 2014, which is incorporated herein by reference in its entirety.

It would be desirable to provide a vapor-forming unit of an aerosol delivery device, the vapor-forming unit being configured for improved vapor formation and/or improved integration with a power unit. It would also be desirable to provide aerosol delivery devices that are prepared utilizing such vapor-forming units.

SUMMARY OF THE DISCLOSURE

The present disclosure relates to aerosol delivery devices, methods of forming such devices, and elements of such devices. The aerosol delivery devices can particularly integrate ceramic wicks to form vapor-forming units that can be combined with power units to form the aerosol delivery devices.

In one or more embodiments, the present disclosure can provide an aerosol delivery device that includes at least a vapor-forming unit. The vapor-forming unit may function in a manner similar to cartridges and/or tanks that are known for use in aerosol delivery devices. As an exemplary embodiment, a vapor-forming unit of an aerosol delivery device can comprise the following:

- a housing formed at least in part by an outer wall;
- a flow tube positioned interior to the outer wall of the housing;
- an annular space defined between the outer wall of the housing and the flow tube;
- an airflow path through the device between a connector end of the housing and a mouthend of the housing, the airflow path passing at least partially through the flow tube;
- an atomizer formed of a heater combined with a ceramic wick, the ceramic wick being in a sealing engagement with the flow tube such that at least a portion of the ceramic wick is in the airflow path and at least a portion of the ceramic wick is in fluid communication with the annular space defined between the outer wall of the housing and the flow tube; and
- a sealing member positioned between the ceramic wick and the flow tube and configured to form the sealing engagement.

In various embodiments, the aerosol delivery device can be configured substantially as a tubular or cylindrical body. In particular, the airflow path through the vapor-forming unit can be substantially aligned with the longitudinal axis of the reservoir (e.g., the annular space). As such, the aerosol delivery device can be further defined in relation to one or more of the following statements, which can be combined in any number or order.

The flow tube can include at least one vent configured in a wall thereof, the at least one vent being adapted to allow air flow therethrough and substantially prevent liquid flow therethrough. In particular, the at least one vent configured in the wall of the flow tube may be positioned proximate the mouthend of the housing.

The aerosol delivery device further can comprise a mouthpiece engaging the mouthend of the housing and engaging an end of the flow tube.

The aerosol delivery device further can comprise a connector engaging the connector end of the housing.

The ceramic wick can be substantially solid.

The heater can be a resistance heating wire positioned around an exterior surface of the substantially solid ceramic wick.

The substantially solid ceramic wick can have a longitudinal axis that is substantially perpendicular to a longitudinal axis of the housing.

The substantially solid ceramic wick can extend transversely across the flow tube between a first ceramic wick end and a second ceramic wick end, and the sealing member can be in a sealing engagement with the ceramic wick proximate the first ceramic wick end and the second ceramic wick end.

The ceramic wick can have a hollow interior defining a passageway extending between a first end of the ceramic wick and a second end of the ceramic wick.

The heater can be positioned within the passageway defined in the hollow interior of the ceramic wick.

The second end of the hollow ceramic wick can be engaging a free end of the flow tube.

The first end of the hollow ceramic wick can be in connection with a connector engaging the connector end of the housing.

The sealing member can form the sealing engagement between the free end of the flow tube and the second end of the ceramic wick, and a second sealing member can form a sealing engagement between the first end of the hollow ceramic wick and the connector.

In one or more embodiments, an aerosol delivery device as disclosed herein can include a vapor-forming unit wherein the reservoir and the airflow path through the vapor-forming unit are not substantially aligned. More particularly, the reservoir may be off-set from the airflow path through the vapor-forming unit. As an exemplary embodiment, a vapor-forming unit of an aerosol delivery device can comprise the following

- a housing including an airflow entry and an airflow exit;
- a liquid storage container within the housing and formed of a flexible outer wall and having an opening formed therein; and
- an atomizer within the housing comprising a ceramic wick including an end engaging the opening formed in the liquid storage container and a substantially central portion engaging a heater, the substantially central portion of the ceramic wick and the heater being in an airflow path between the airflow entry and the airflow exit of the housing.

In further embodiments, the aerosol delivery device can be further defined in relation to one or more of the following statements, which can be combined in any number or order.

The ceramic wick can be substantially rod-shaped.

The ceramic wick can have a longitudinal axis, the liquid storage container can have a longitudinal axis, and the longitudinal axes of the ceramic wick and liquid storage container can be substantially parallel.

The longitudinal axes of the ceramic wick and liquid storage container can be substantially perpendicular to a longitudinal axis of the airflow path between the airflow entry and the airflow exit of the housing.

The airflow exit can include a mouthpiece extending outward from the housing.

The housing can comprise a main body that is substantially aligned with an axis of the airflow path and a projection extending substantially perpendicularly from the main body, the projection including the liquid storage container.

The aerosol delivery device further can comprise a power unit that is connectable with the housing, the power unit including a power source.

The power unit can be connectable with the housing such that the housing is external to the power unit when connected.

The power unit can be connectable with the housing such that the housing is entirely internal to the power unit when connected.

The power unit can include a mouthpiece.

The housing can be configured for insertion into the power unit such that the airflow exit of the housing is substantially aligned with an aerosol entry into the mouthpiece.

The mouthpiece can be movable between an open position wherein formed aerosol may pass therethrough and a closed position wherein formed aerosol is substantially prevented from passage therethrough.

BRIEF DESCRIPTION OF THE FIGURES

Figure 1:
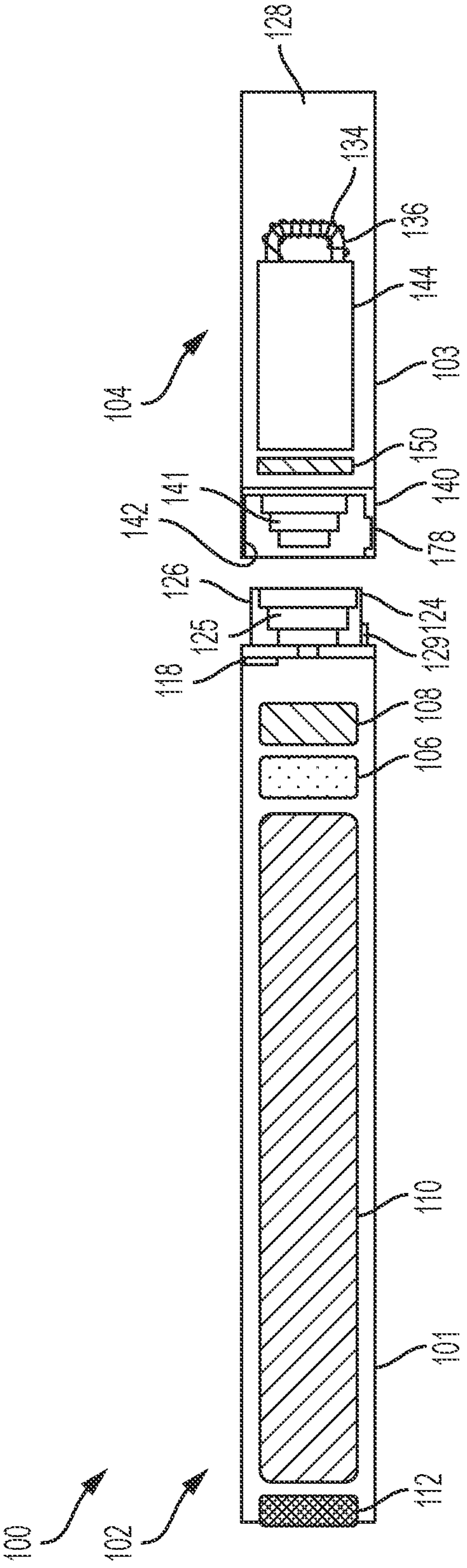
Figure 2:
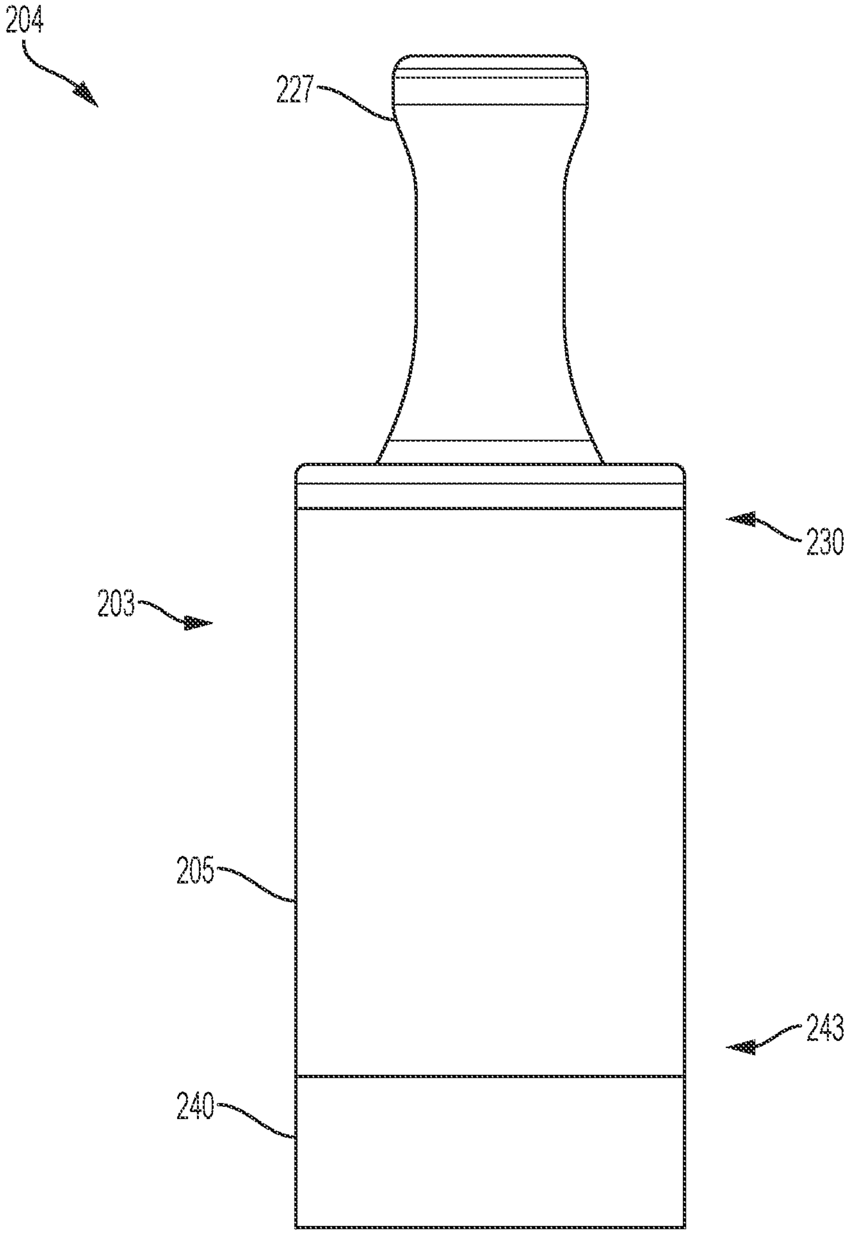
Figure 3:
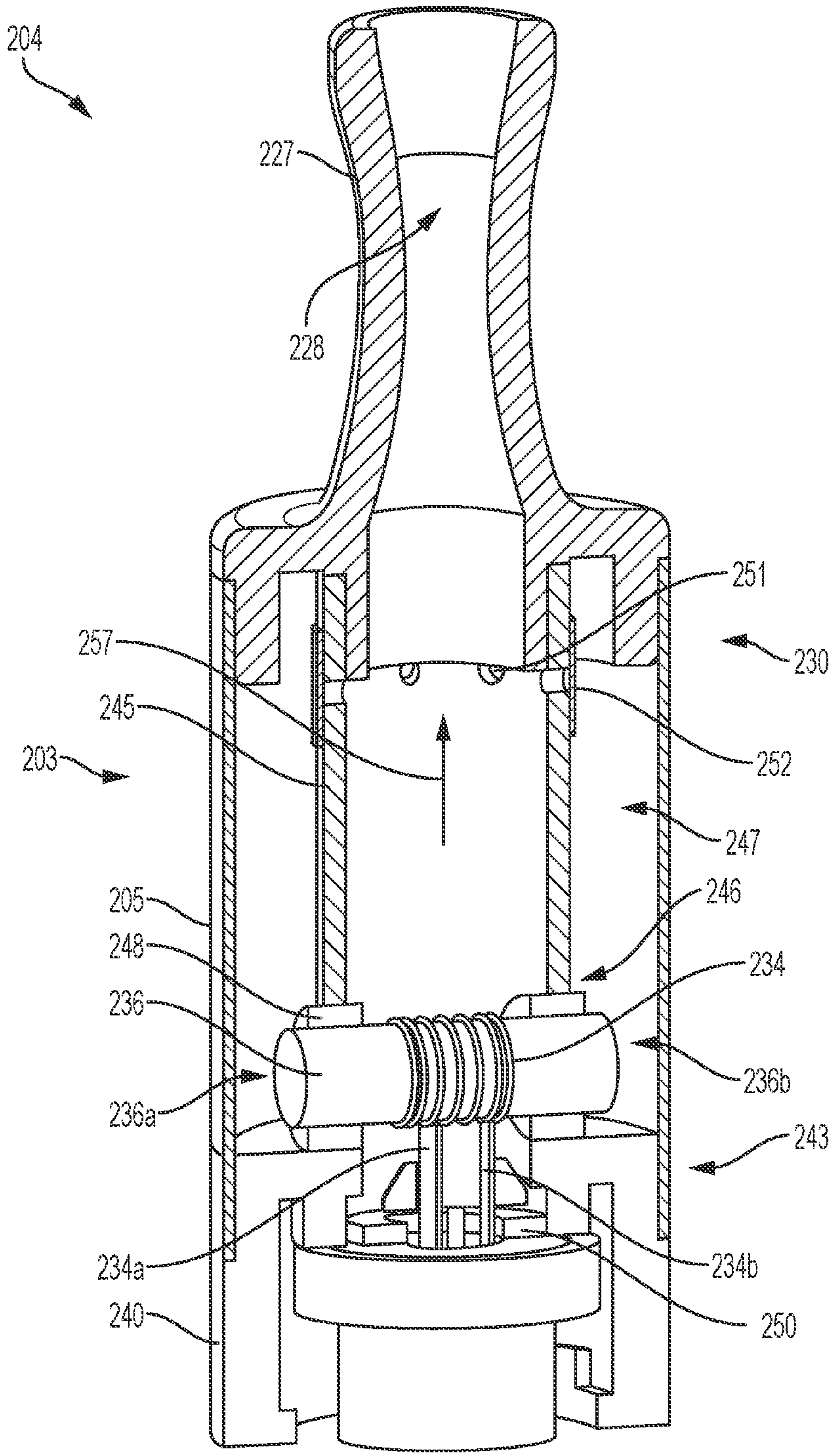
Figure 4:
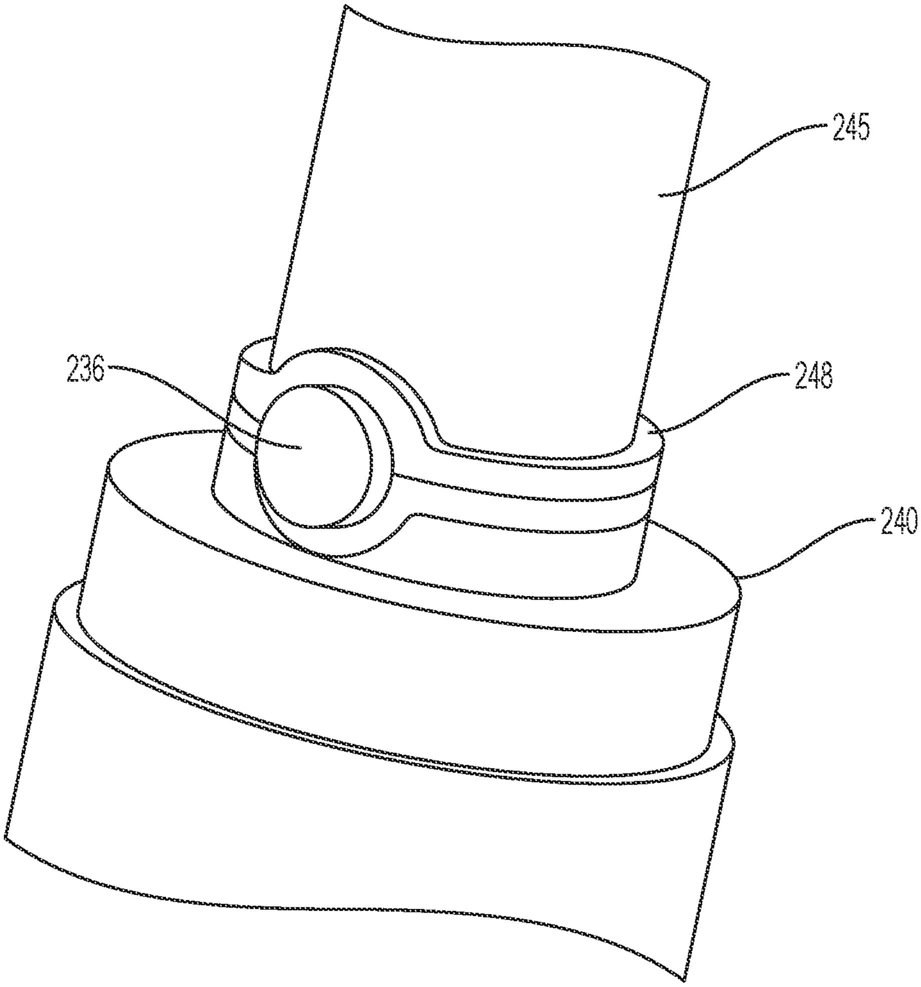
Figure 5:
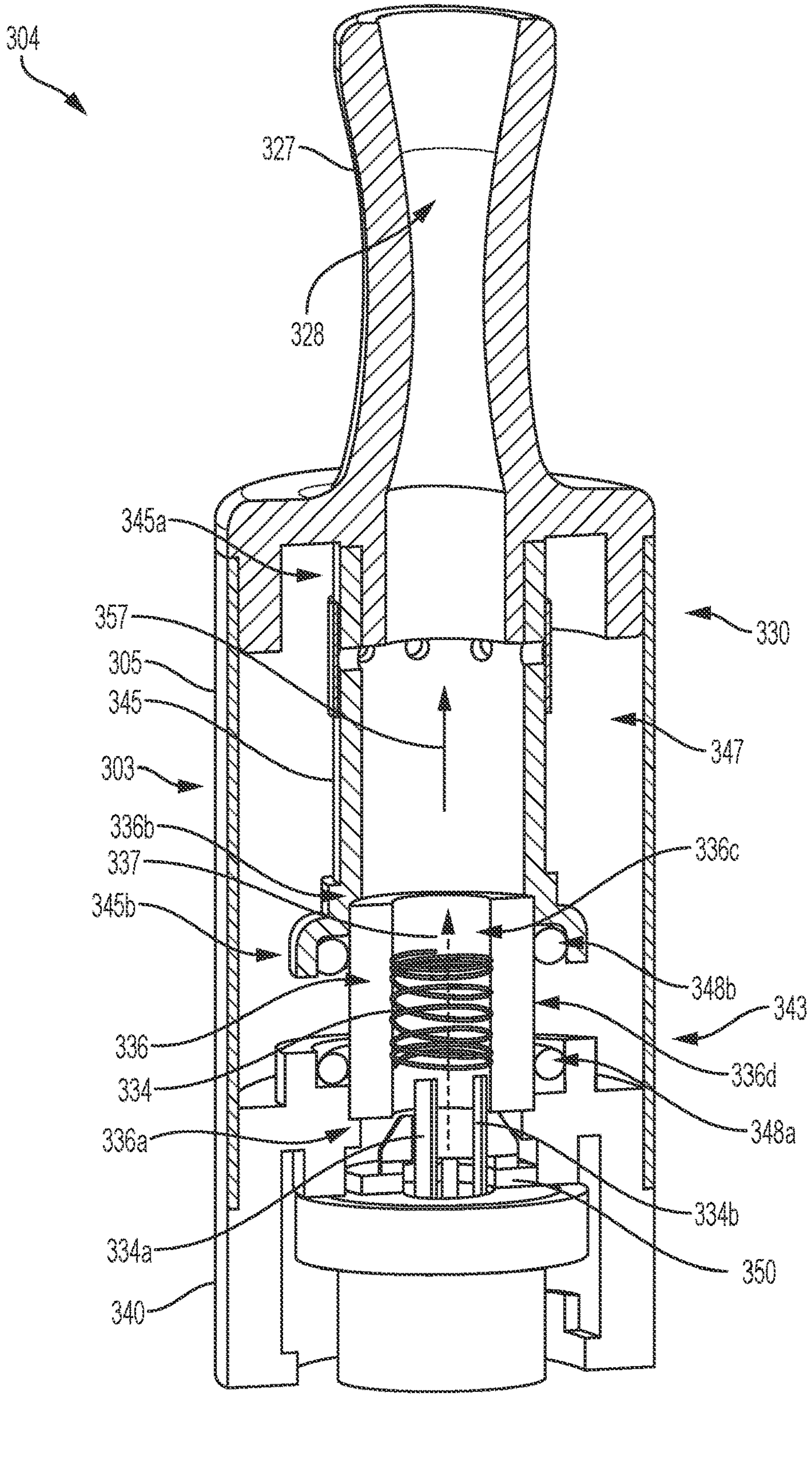
Figure 6:
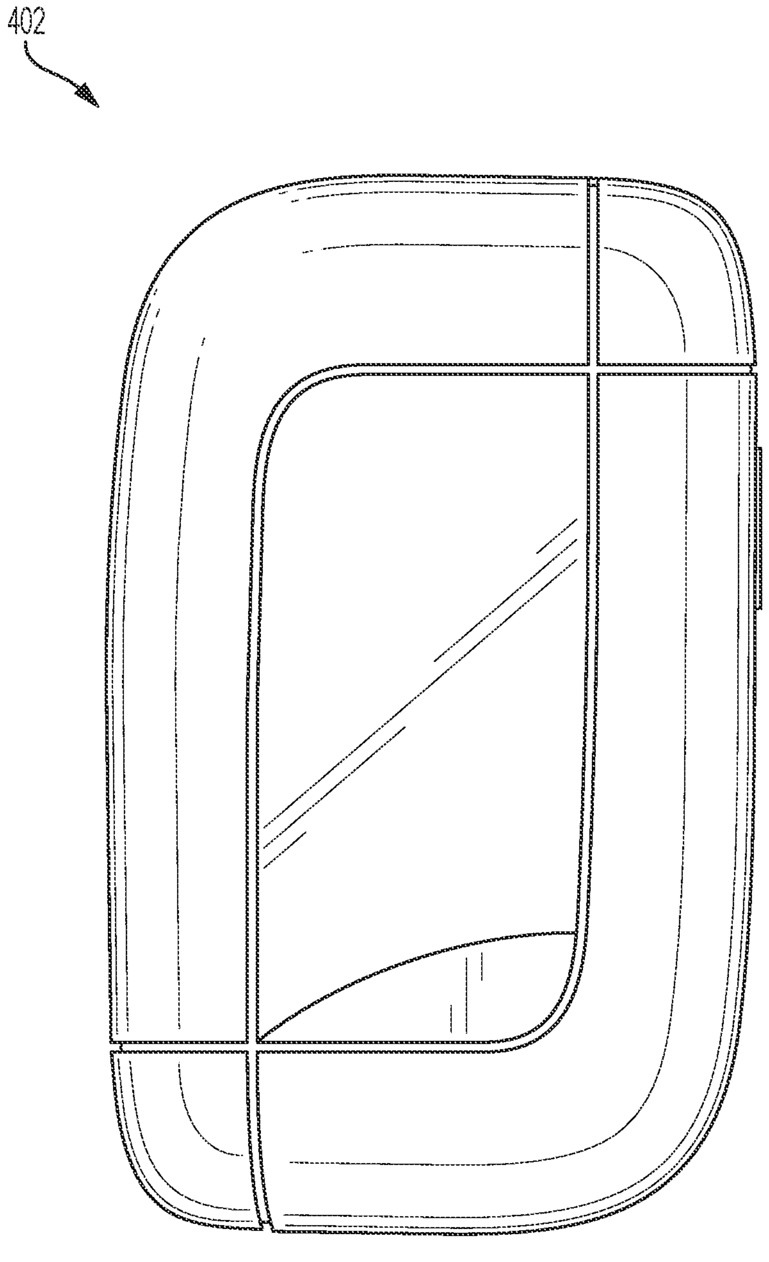
Figure 7:
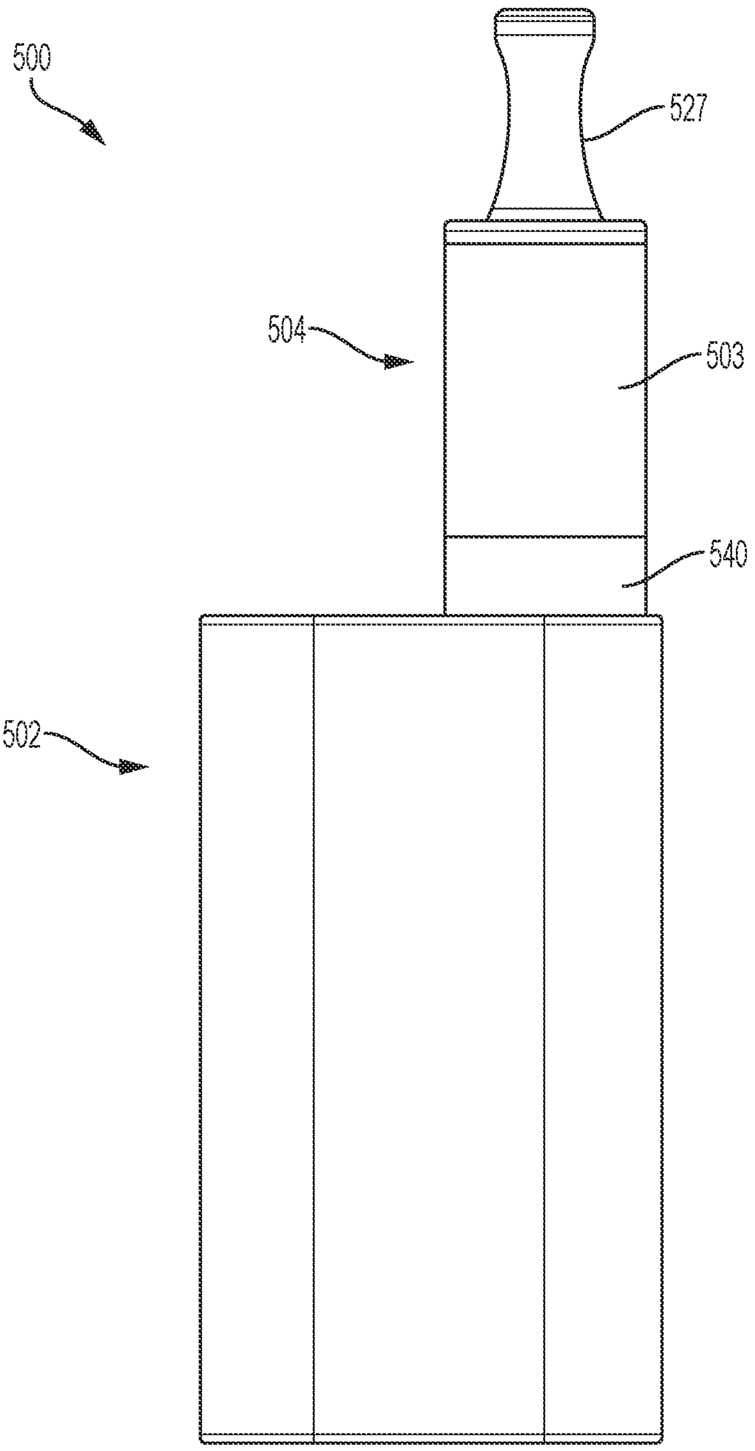
Figure 8:
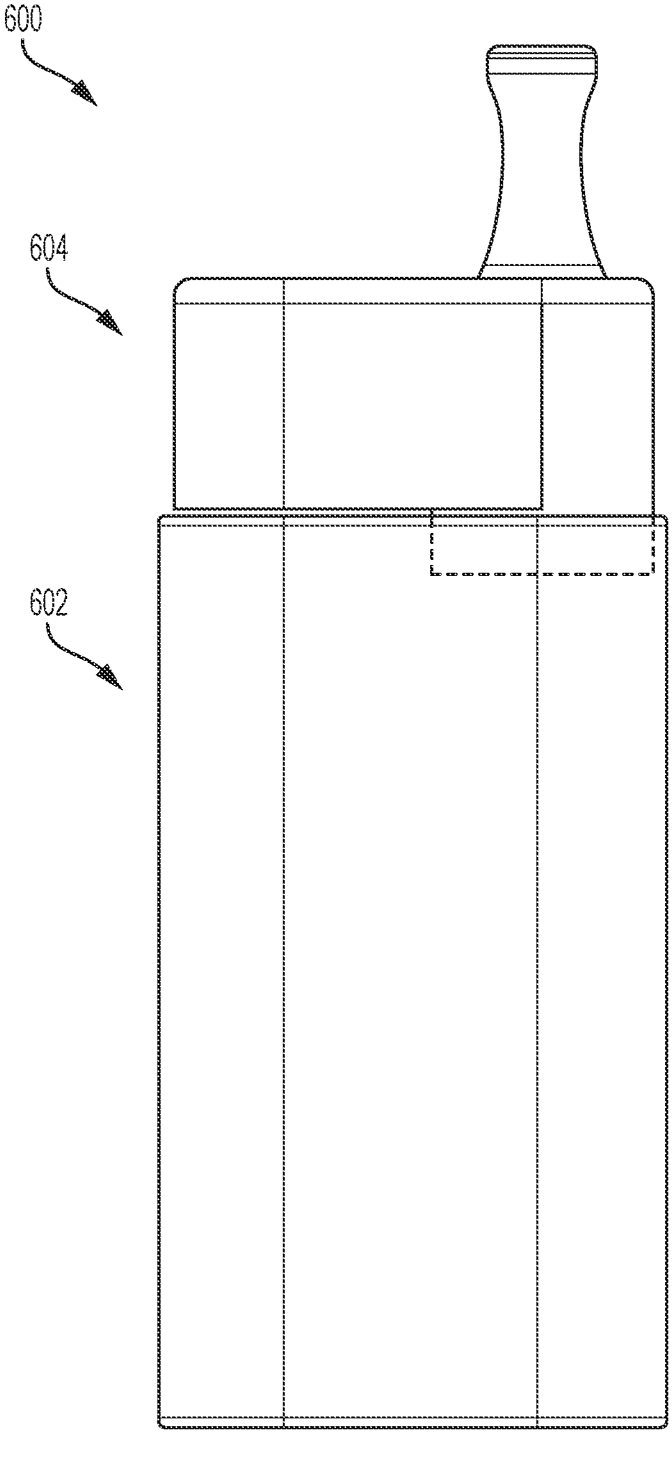
Figure 9:
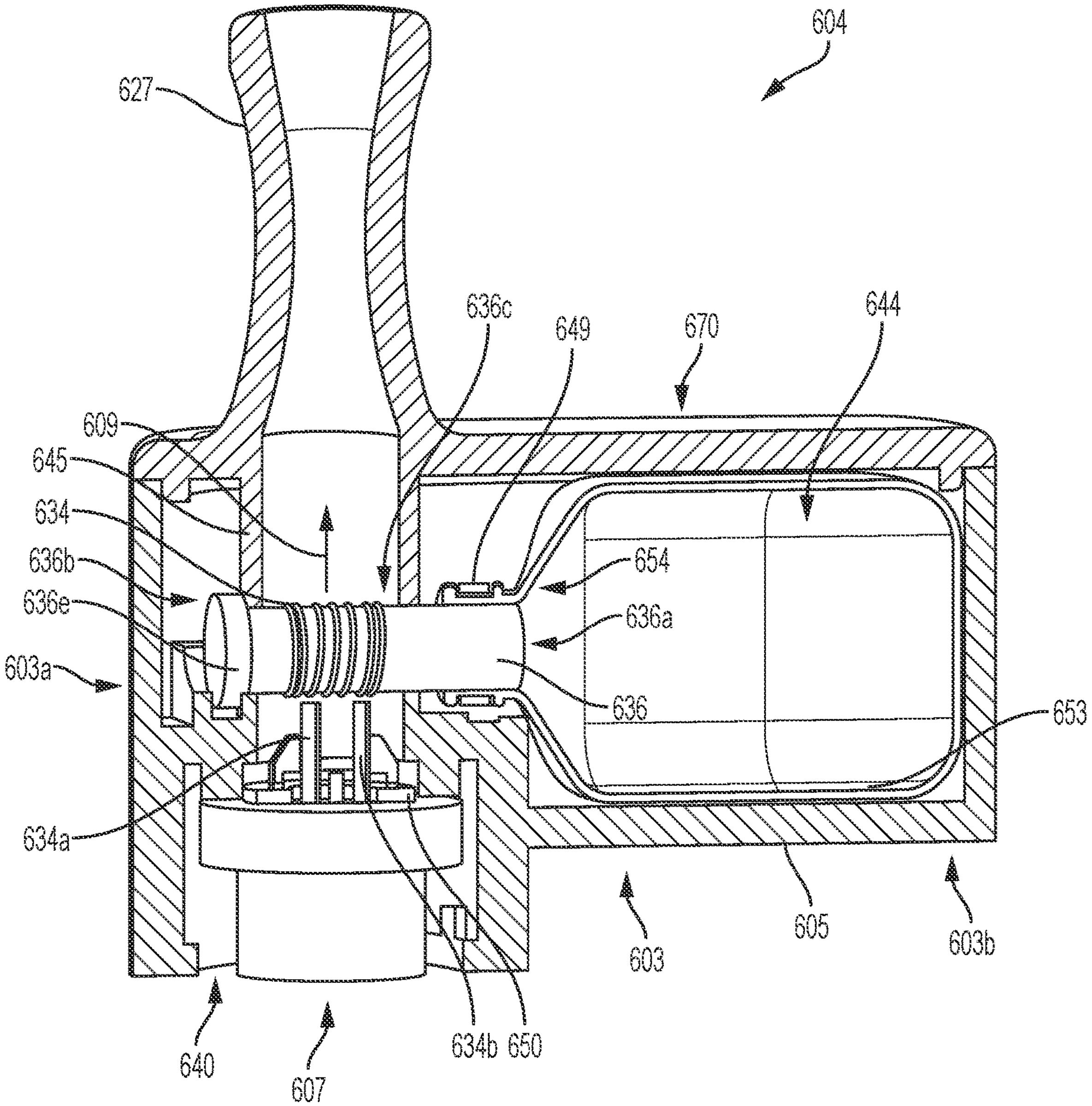
Figure 10:
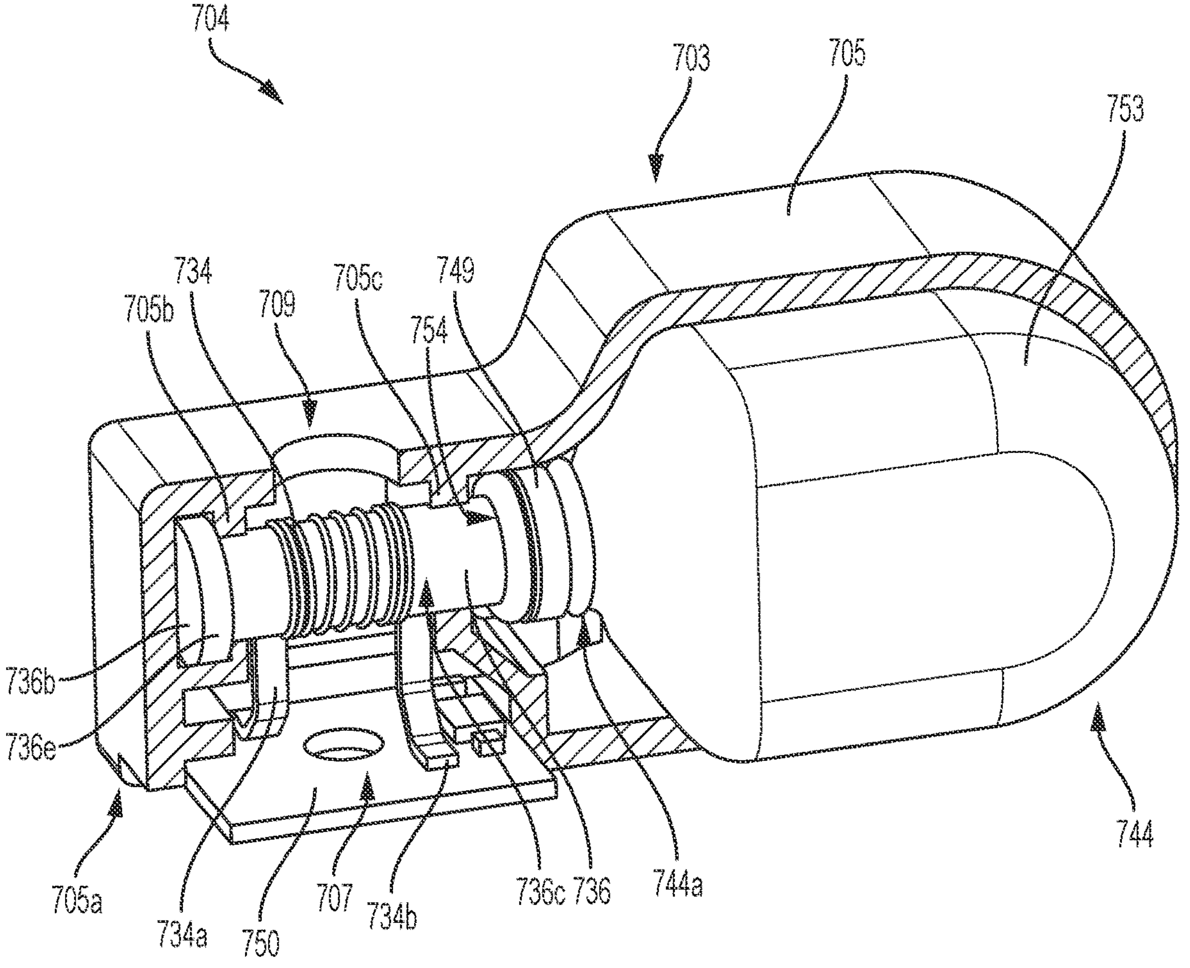
Figure 11:
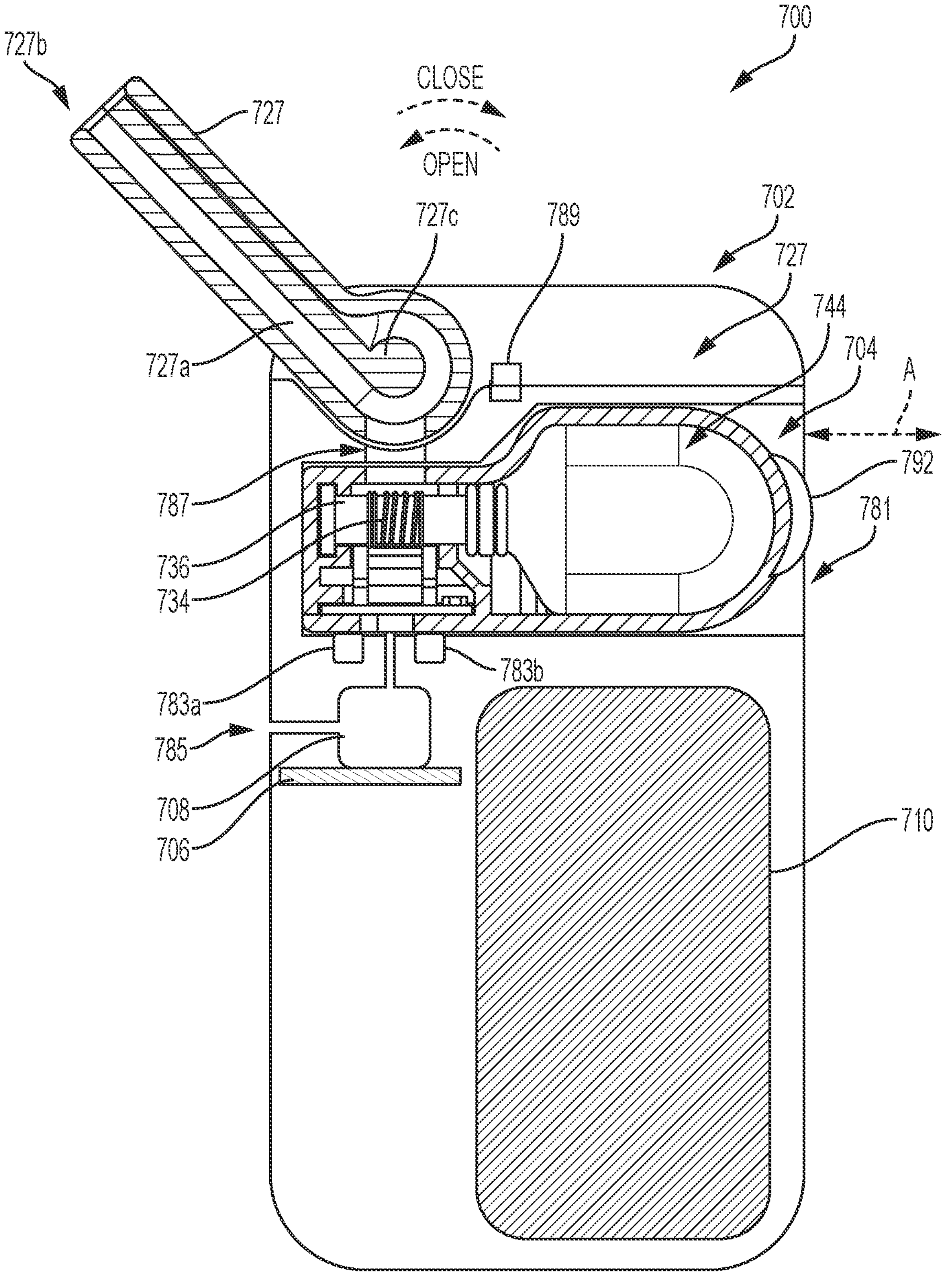

Having thus described the disclosure in the foregoing general terms, reference will now be made to the accompanying drawings, which are not necessarily drawn to scale, and wherein:

FIG. 1 is a partially cut-away view of an aerosol delivery device comprising a cartridge and a power unit including a variety of elements that may be utilized in an aerosol delivery device according to various embodiments of the present disclosure;

FIG. 2 is an illustration of a vapor-forming unit that is substantially tubular or cylindrical in shape for use in an aerosol delivery device according to various embodiments of the present disclosure;

FIG. 3 is a partially cut-away view of a vapor-forming unit showing the internal construction thereof according to various embodiments of the present disclosure;

FIG. 4 is a partial view of a vapor-forming unit showing the relationship between the flow tube, the connector, and the wick according to various embodiments of the present disclosure;

FIG. 5 is a partially cut-away view of a vapor-forming unit showing the internal construction thereof according to various embodiments of the present disclosure;

FIG. 6 is an illustration of a power unit useful for combination with a vapor-forming unit according to various embodiments of the present disclosure;

FIG. 7 is an illustration of an aerosol delivery device according to various embodiments of the present disclosure including a power unit and a vapor-forming unit;

FIG. 8 is an illustration of an aerosol delivery device according to various embodiments of the present disclosure including a power unit and a vapor-forming unit;

FIG. 9 is a partially cut-away view of a vapor-forming unit showing the internal construction thereof according to various embodiments of the present disclosure;

FIG. 10 is a partially cut-away view of a vapor-forming unit showing the internal construction thereof according to various embodiments of the present disclosure; and FIG. 11 is a partially cut-away view of an aerosol delivery device according to various embodiments of the present disclosure showing a vapor-forming unit combined with a power unit.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms “a”, “an”, “the”, include plural referents unless the context clearly dictates otherwise.

As described hereinafter, embodiments of the present disclosure relate to aerosol delivery systems. Aerosol delivery systems according to the present disclosure use electrical energy to heat a material (preferably without combusting the material to any significant degree and/or without significant chemical alteration of the material) to form an inhalable substance; and components of such systems have the form of articles that most preferably are sufficiently compact to be considered hand-held devices. That is, use of components of preferred aerosol delivery systems does not result in the production of smoke—i.e., from by-products of combustion or pyrolysis of tobacco, but rather, use of those preferred systems results in the production of vapors resulting from volatilization or vaporization of certain components incorporated therein. In preferred embodiments, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term “aerosol” as used herein is meant to include vapors, gases, and aerosols of a form or type suitable for human inhalation, whether or not visible, and whether or not of a form that might be considered to be smoke-like.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing, or the elongated housing can be formed of two or more separable bodies. For example, an aerosol delivery device can comprise an elongated shell or body that can be substantially tubular in shape and, as such, resemble the shape of a conventional cigarette or cigar. In one embodiment, all of the components of the aerosol delivery device are contained within one housing. Alternatively, an aerosol delivery device can comprise two or more housings that are joined and are separable. For example, an aerosol delivery device can possess at one end a control body (or power unit) comprising a housing containing one or more components (e.g., a battery and various electronics for controlling the operation of that article), and at the other end and removably attached thereto an outer body or shell containing aerosol forming components (e.g., one or more aerosol precursor components, such as flavors and aerosol formers, one or more heaters, and/or one or more wicks).

Aerosol delivery devices of the present disclosure can be formed of an outer housing or shell that is not substantially tubular in shape but may be formed to substantially greater dimensions. The housing or shell can be configured to include a mouthpiece and/or may be configured to receive a separate shell (e.g., a cartridge or tank) that can include consumable elements, such as a liquid aerosol former, and can include a vaporizer or atomizer.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microcontroller or microprocessor), a heater or heat generation member (e.g., an electrical resistance heating element or other component, which alone or in combination with one or more further elements may be commonly referred to as an “atomizer”), an aerosol precursor composition (e.g., commonly a liquid capable of yielding an aerosol upon application of sufficient heat, such as ingredients commonly referred to as “smoke juice,” “e-liquid” and “e-juice”), and a mouthpiece or mouth region for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in the background art section of the present disclosure.

One example embodiment of an aerosol delivery device 100 illustrating components that may be utilized in an aerosol delivery device according to the present disclosure is provided in FIG. 1. As seen in the cut-away view illustrated therein, the aerosol delivery device 100 can comprise a power unit 102 and a cartridge 104 that can be permanently or detachably aligned in a functioning relationship. Engagement of the power unit 102 and the cartridge 104 can be press fit (as illustrated), threaded, interference fit, magnetic, or the like. In particular, connection components, such as further described herein may be used. For example, the power unit may include a coupler that is adapted to engage a connector on the cartridge.

In specific embodiments, one or both of the power unit 102 and the cartridge 104 may be referred to as being disposable or as being reusable. For example, the power unit may have a replaceable battery or a rechargeable battery and thus may be combined with any type of recharging technology, including connection to a typical electrical outlet, connection to a car charger (i.e., cigarette lighter receptacle), and connection to a computer, such as through a universal serial bus (USB) cable. For example, an adaptor including a USB connector at one end and a power unit connector at an opposing end is disclosed in U.S. Pat. Pub. No. 2014/0261495 to Novak et al., which is incorporated herein by reference in its entirety. Further, in some embodiments the cartridge may comprise a single-use cartridge, as disclosed in U.S. Pat. No. 8,910,639 to Chang et al., which is incorporated herein by reference in its entirety.

As illustrated in FIG. 1, a power unit 102 can be formed of a power unit shell 101 that can include a control component 106 (e.g., a printed circuit board (PCB), an integrated circuit, a memory component, a microcontroller, or the like), a flow sensor 108, a battery 110, and an LED 112, and such components can be variably aligned. Further indicators (e.g., a haptic feedback component, an audio feedback component, or the like) can be included in addition to or as an alternative to the LED. Additional representative types of components that yield visual cues or indicators, such as light emitting diode (LED) components, and the configurations and uses thereof, are described in U.S. Pat. No. 5,154,192 to Sprinkel et al.; U.S. Pat. No. 8,499,766 to Newton and U.S. Pat. No. 8,539,959 to Scatterday; U.S. Pat. Pub. No. 2015/0020825 to Galloway et al.; and U.S. Pat. Pub. No. 2015/0216233 to Sears et al.; which are incorporated herein by reference.

A cartridge 104 can be formed of a cartridge shell 103 enclosing the reservoir 144 that is in fluid communication with a liquid transport element 136 adapted to wick or otherwise transport an aerosol precursor composition stored in the reservoir housing to a heater 134. A liquid transport element can be formed of one or more materials configured for transport of a liquid, such as by capillary action. A liquid transport element can be formed of, for example, fibrous materials (e.g., organic cotton, cellulose acetate, regenerated cellulose fabrics, glass fibers), porous ceramics, porous carbon, graphite, porous glass, sintered glass beads, sintered ceramic beads, capillary tubes, or the like. The liquid transport element thus can be any material that contains an open pore network (i.e., a plurality of pores that are interconnected so that fluid may flow from one pore to another in a plurality of direction through the element). Various embodiments of materials configured to produce heat when electrical current is applied therethrough may be employed to form the resistive heating element 134. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), titanium, platinum, silver, palladium, graphite and graphite-based materials (e.g., carbon-based foams and yarns) and ceramics (e.g., positive or negative temperature coefficient ceramics).

An opening 128 may be present in the cartridge shell 103 (e.g., at the mouthend) to allow for egress of formed aerosol from the cartridge 104. Such components are representative of the components that may be present in a cartridge and are not intended to limit the scope of cartridge components that are encompassed by the present disclosure.

The cartridge 104 also may include one or more electronic components 150, which may include an integrated circuit, a memory component, a sensor, or the like. The electronic component 150 may be adapted to communicate with the control component 106 and/or with an external device by wired or wireless means. The electronic component 150 may be positioned anywhere within the cartridge 104 or its base 140.

Although the control component 106 and the flow sensor 108 are illustrated separately, it is understood that the control component and the flow sensor may be combined as an electronic circuit board with the air flow sensor attached directly thereto. Further, the electronic circuit board may be positioned horizontally relative the illustration of FIG. 1 in that the electronic circuit board can be lengthwise parallel to the central axis of the power unit. In some embodiments, the air flow sensor may comprise its own circuit board or other base element to which it can be attached. In some embodiments, a flexible circuit board may be utilized. A flexible circuit board may be configured into a variety of shapes, include substantially tubular shapes.

The power unit 102 and the cartridge 104 may include components adapted to facilitate a fluid engagement therebetween. As illustrated in FIG. 1, the power unit 102 can include a coupler 124 having a cavity 125 therein. The cartridge 104 can include a base 140 adapted to engage the coupler 124 and can include a projection 141 adapted to fit within the cavity 125. Such engagement can facilitate a stable connection between the power unit 102 and the cartridge 104 as well as establish an electrical connection between the battery 110 and control component 106 in the power unit and the heater 134 in the cartridge. Further, the power unit shell 101 can include an air intake 118, which may be a notch in the shell where it connects to the coupler 124 that allows for passage of ambient air around the coupler and into the shell where it then passes through the cavity 125 of the coupler and into the cartridge through the projection 141.

A coupler and a base useful according to the present disclosure are described in U.S. Pat. Pub. No. 2014/0261495 to Novak et al., the disclosure of which is incorporated herein by reference in its entirety. For example, a coupler as seen in FIG. 1 may define an outer periphery 126 configured to mate with an inner periphery 142 of the base 140. In one embodiment the inner periphery of the base may define a radius that is substantially equal to, or slightly greater than, a radius of the outer periphery of the coupler. Further, the coupler 124 may define one or more protrusions 129 at the outer periphery 126 configured to engage one or more recesses 178 defined at the inner periphery of the base. However, various other embodiments of structures, shapes, and components may be employed to couple the base to the coupler. In some embodiments the connection between the base 140 of the cartridge 104 and the coupler 124 of the power unit 102 may be substantially permanent, whereas in other embodiments the connection therebetween may be releasable such that, for example, the power unit may be reused with one or more additional cartridges that may be disposable and/or refillable.

The aerosol delivery device 100 may be substantially rod-like or substantially tubular shaped or substantially cylindrically shaped in some embodiments. In other embodiments, further shapes and dimensions are encompassed—e.g., a rectangular or triangular cross-section, multifaceted shapes, or the like. In particular, the power unit 102 may be non-rod-like and may rather be substantially rectangular, round, or have some further shape. Likewise, the power unit 102 may be substantially larger than a power unit that would be expected to be substantially the size of a conventional cigarette.

The reservoir 144 illustrated in FIG. 1 can be a container (e.g., formed of walls substantially impermeable to the aerosol precursor composition) or can be a fibrous reservoir. Container walls can be flexible and can be collapsible. Container walls alternatively can be substantially rigid. In exemplary embodiments, the reservoir 144 can comprise one or more layers of nonwoven fibers substantially formed into the shape of a tube encircling the interior of the cartridge shell 103. An aerosol precursor composition can be retained in the reservoir 144. Liquid components, for example, can be sorptively retained by the reservoir 144 (i.e., when the reservoir 144 includes a fibrous material). The reservoir 144 can be in fluid connection with a liquid transport element 136. The liquid transport element 136 can transport the aerosol precursor composition stored in the reservoir 144 via capillary action to the heating element 134 that is in the form of a metal wire coil in this embodiment. As such, the heating element 134 is in a heating arrangement with the liquid transport element 136.

In use, when a user draws on the article 100, airflow is detected by the sensor 108, the heating element 134 is activated, and the components for the aerosol precursor composition are vaporized by the heating element 134.

Drawing upon the mouthend of the article 100 causes ambient air to enter the air intake 118 and pass through the cavity 125 in the coupler 124 and the central opening in the projection 141 of the base 140. In the cartridge 104, the drawn air combines with the formed vapor to form an aerosol. The aerosol is whisked, aspirated, or otherwise drawn away from the heating element 134 and out the mouth opening 128 in the mouthend of the article 100.

An input element may be included with the aerosol delivery device. The input may be included to allow a user to control functions of the device and/or for output of information to a user. Any component or combination of components may be utilized as an input for controlling the function of the device. For example, one or more pushbuttons may be used as described in U.S. Pub. No. 2015/0245658 to Worm et al., which is incorporated herein by reference. Likewise, a touchscreen may be used as described in U.S. patent application Ser. No. 14/643,626, filed Mar. 10, 2015, to Sears et al., which is incorporated herein by reference. As a further example, components adapted for gesture recognition based on specified movements of the aerosol delivery device may be used as an input. See U.S. Pub. 2016/0158782 to Henry et al., which is incorporated herein by reference.

In some embodiments, an input may comprise a computer or computing device, such as a smartphone or tablet. In particular, the aerosol delivery device may be wired to the computer or other device, such as via use of a USB cord or similar protocol. The aerosol delivery device also may communicate with a computer or other device acting as an input via wireless communication. See, for example, the systems and methods for controlling a device via a read request as described in U.S. Pub. No. 2016/0007561 to Ampolini et al., the disclosure of which is incorporated herein by reference. In such embodiments, an APP or other computer program may be used in connection with a computer or other computing device to input control instructions to the aerosol delivery device, such control instructions including, for example, the ability to form an aerosol of specific composition by choosing the nicotine content and/or content of further flavors to be included.

The various components of an aerosol delivery device according to the present disclosure can be chosen from components described in the art and commercially available. Examples of batteries that can be used according to the disclosure are described in U.S. Pat. Pub. No. 2010/0028766 to Peckerar et al., the disclosure of which is incorporated herein by reference in its entirety.

The aerosol delivery device can incorporate a sensor or detector for control of supply of electric power to the heat generation element when aerosol generation is desired (e.g., upon draw during use). As such, for example, there is provided a manner or method for turning off the power supply to the heat generation element when the aerosol delivery device is not be drawn upon during use, and for turning on the power supply to actuate or trigger the generation of heat by the heat generation element during draw. Additional representative types of sensing or detection mechanisms, structure and configuration thereof, components thereof, and general methods of operation thereof, are described in U.S. Pat. No. 5,261,424 to Sprinkel, Jr.; U.S. Pat. No. 5,372,148 to McCafferty et al.; and PCT WO 2010/003480 to Flick; which are incorporated herein by reference.

The aerosol delivery device most preferably incorporates a control mechanism for controlling the amount of electric power to the heat generation element during draw. Representative types of electronic components, structure and configuration thereof, features thereof, and general methods of operation thereof, are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al. and U.S. Pat. No. 8,205,622 to Pan; U.S. Pat. Pub. Nos. 2009/0230117 to Fernando et al., 2014/0060554 to Collet et al., and 2014/0270727 to Ampolini et al.; and U.S. Pub. No. 2015/0257445 to Henry et al.; which are incorporated herein by reference.

Representative types of substrates, reservoirs or other components for supporting the aerosol precursor are described in U.S. Pat. No. 8,528,569 to Newton; U.S. Pat. Pub. Nos. 2014/0261487 to Chapman et al. and 2014/0059780 to Davis et al.; and U.S. Pub. No. 2015/0216232 to Bless et al.; which are incorporated herein by reference. Additionally, various wicking materials, and the configuration and operation of those wicking materials within certain types of electronic cigarettes, are set forth in U.S. Pat. No. 8,910,640 to Sears et al.; which is incorporated herein by reference.

For aerosol delivery systems that are characterized as electronic cigarettes, the aerosol precursor composition most preferably incorporates tobacco or components derived from tobacco. In one regard, the tobacco may be provided as parts or pieces of tobacco, such as finely ground, milled or powdered tobacco lamina. In another regard, the tobacco may be provided in the form of an extract, such as a spray dried extract that incorporates many of the water soluble components of tobacco. Alternatively, tobacco extracts may have the form of relatively high nicotine content extracts, which extracts also incorporate minor amounts of other extracted components derived from tobacco. In another regard, components derived from tobacco may be provided in a relatively pure form, such as certain flavoring agents that are derived from tobacco. In one regard, a component that is derived from tobacco, and that may be employed in a highly purified or essentially pure form, is nicotine (e.g., pharmaceutical grade nicotine).

The aerosol precursor composition, also referred to as a vapor precursor composition, may comprise a variety of components including, by way of example, a polyhydric alcohol (e.g., glycerin, propylene glycol, or a mixture thereof), nicotine, tobacco, tobacco extract, and/or flavorants. Representative types of aerosol precursor components and formulations also are set forth and characterized in U.S. Pat. No. 7,217,320 to Robinson et al. and U.S. Pat. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

The amount of aerosol precursor that is incorporated within the aerosol delivery system is such that the aerosol generating piece provides acceptable sensory and desirable performance characteristics. For example, it is highly preferred that sufficient amounts of aerosol forming material (e.g., glycerin and/or propylene glycol), be employed in order to provide for the generation of a visible mainstream aerosol that in many regards resembles the appearance of tobacco smoke. The amount of aerosol precursor within the aerosol generating system may be dependent upon factors such as the number of puffs desired per aerosol generating piece. Typically, the amount of aerosol precursor incorporated within the aerosol delivery system, and particularly within the aerosol generating piece, is less than about 2 g, generally less than about 1.5 g, often less than about 1 g and frequently less than about 0.5 g.

Yet other features, controls or components that can be incorporated into aerosol delivery systems of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 8,365,742 to Hon; U.S. Pat. No. 8,402,976 to Fernando et al.; U.S. Pat. Pub. Nos. 2010/0163063 to Fernando et al.; 2013/0192623 to Tucker et al.; 2013/0298905 to Leven et al.; 2013/0180553 to Kim et al., 2014/0000638 to Sebastian et al., 2014/0261495 to Novak et al., and 2014/0261408 to DePiano et al.; which are incorporated herein by reference.

The foregoing description of use of the article can be applied to the various embodiments described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article illustrated in FIG. 1 or as otherwise described above may be included in an aerosol delivery device according to the present disclosure.

In one or more embodiments, the present disclosure particularly can relate to aerosol delivery devices that are configured to provide increased vapor production. Such increase can arise from a variety of factors. In some embodiments, a liquid transport element (i.e., a wick or wicking element) can be formed partially or completely from a ceramic material, particularly a porous ceramic. Exemplary ceramic materials suitable for use according to embodiments of the present disclosure are described, for example, in U.S. patent application Ser. No. 14/988,109, filed Jan. 5, 2016, and US Pat. No. 2014/0123989 to LaMothe, the disclosures of which are incorporated herein by reference. The porous ceramic can form a substantially solid wick—i.e., being a single, monothilic material rather than a bundle of individual fibers as known in the art.

In some embodiments, a heating element can be configured for increased vaporization, such as arising from an increased heating temperature, which can be tolerated because of the use of the ceramic wick, or arising from a larger heating surface (e.g., having a greater number of coils of a resistance heating wire wrapped around a ceramic wick). In some embodiments, increased vapor production can relate to a larger reservoir capacity—i.e., having a larger volume of aerosol precursor composition to allow for an increased total vapor production for an individual cartridge or tank.

In some embodiments, the present disclosure can relate to an aerosol delivery device and, in particular, to a vapor-forming unit. The vapor-forming unit may be referred to as a tank in light of the ability to store a relatively large volume of aerosol precursor composition in the reservoir thereof. The term "tank," however, should not be construed as limiting, and the unit likewise may be characterized as being a cartridge. Generally, the vapor-forming unit can be combined with a power unit. Alternatively, the vapor-forming unit may have a power-producing element included therewith.

As seen in FIG. 2, the aerosol delivery device can include the vapor-forming unit 204, which can comprise a housing 203 that is formed at least in part by an outer wall 205. The vapor-forming unit 204 can further comprise a connector 240 that can be positioned at a connector end 243 of the housing 203. A mouthpiece 227 can be positioned at a mouthend 230 of the housing 203.

The internal construction of the vapor-forming unit 204 is evident in FIG. 3. In particular, a flow tube 245 is positioned interior to the outer wall 205 of the housing 203. The flow tube 245 can be formed of any suitable material, such as metal, polymer, ceramic compositions. The flow tube 245 is preferably formed of a material that does not degrade under temperatures achieved proximate the heater and is thus heat stable. The arrangement of the flow tube 245 and the outer wall 205 of the housing 203 can define an annular space 247 therebetween. The annular space 247 can function effectively as a reservoir for an aerosol precursor composition. The annular space 247 can be substantially empty of other materials apart from the aerosol precursor composition. In some embodiments, however, a fibrous material can be included in the annular space 247 if desired to sorptively retain at least a portion of the aerosol precursor composition. An airflow path 257 can be present through the vapor-forming unit 204 and can be present particularly between the connector end 243 of the housing 203 and the mouthend 230 of the housing 203. The airflow path 257 extends at least partially through the flow tube 245. The airflow path 257, however, also can extend through additional elements of the device, such as through an internal channel 228 of the mouthpiece 227 and/or the connector 240. Connectors and airflow paths therethrough suitable for use according to the incorporated herein by reference.

The vapor-forming unit 204 of FIG. 3 can further include a heater 234 and a wick 236 that collectively can be characterized as an atomizer or atomizer unit. The heater 234 and wick 236 interact with the flow tube 245 such that aerosol precursor composition in the annular space 247 is transported via the wick to the heater where it is vaporized within the flow tube or within a space that is in fluid communication with the flow tube (e.g., being immediately adjacent an end of the flow tube. Accordingly, at least a portion of the wick 236 is in the airflow path 257 and at least a portion of the wick is in fluid communication with the annular space 247. The interaction between the wick 236 and the flow tube 245 can be characterized as a sealing engagement in that the wick can pass through an opening 246 formed in the flow tube in a manner such that aerosol precursor composition from the annular space 247 is substantially prevented from passing through the opening apart from passage through the wick itself.

In some embodiments, a sealing engagement may be facilitated by use of a sealing member 248 that can be positioned between the wick 236 and the flow tube 247. The sealing member 248 can engage the wick 236 and the flow tube 245 in a variety of manners, and only a single sealing member or a plurality of sealing members can be utilized. An arrangement of the wick 236, flow tube 245, sealing member 248, and connector 240 is illustrated in FIG. 4. In the illustrated embodiment, the wick 236 is essentially positioned between the flow tube 245 and the connector 240. The opening 246 (see FIG. 3) in the flow tube 245 is in the form of a cut-out in the end of the flow tube wall. A corresponding cut-out may be formed in the connector 240.

The wick 236 passes through the cut-out on one side or both sides of the flow tube 245, and the sealing member 246 fills any space between the outer surface of the wick and the inner surface of the cut-out in the flow tube (and optionally the connector). As illustrated, the sealing member 246 also functions as a sealing member between the an end of the flow tube 245 and the connector 240 to effectively seal the connection of the two elements. In other words, the flow tube 245 can extend fully between the mouthpiece 227 and the connector 240. The sealing member 248 can be formed of any suitable sealant such as silicone, rubber, or other resilient material.

Returning to FIG. 3, the flow tube 245 can include a vent that can be formed by one or more vents or vent openings 251. The vent 251 can be configured for pressure equalization within the annular space 247 as liquid is depleted therefrom. In some embodiments, the vent 251 can include a vent cover 252. The vent cover 252 can be formed of a microporous material. Preferably, the vent cover 252 is effective to allow passage of gas (e.g., air) therethrough while substantially preventing the passage of liquid therethrough. The vent may be positioned at various locations along the flow tube 245 and particularly can be provided proximate the interconnection between the flow tube and the mouthpiece 227. The flow tube 245 thus can engage or abut the mouthpiece 227 at a first end of the flow tube and can engage or abut the connector 240 at a second end of the flow tube.

In one or more embodiments, the heater 234 can specifically be in the form of a resistance heating wire that can be coiled or otherwise positioned around an exterior surface of the wick 236. In this manner, vapor is formed around the exterior of the wick 236 to be whisked away by air passing across the wick and the heater 234 and into the airflow path 257. The wick 236 specifically can have a longitudinal axis that is substantially perpendicular to a longitudinal axis of the housing 203. In some embodiments, the wick 236 can extend transversely across the flow tube 245 between a first wick end 236*a* and a second wick end 236*b*. Further, the sealing member 248 can be in a sealing engagement with the wick 236 proximate the first wick end 236*a* and the second wick end 236*b*. The first and second wick ends (236*a*, 236*b*) can extend beyond the sealing member 248 or can be substantially flus with the sealing member so long as the aerosol precursor composition in the annular space 247 is capable of achieving a fluid connection with the wick ends.

Electrical terminals (234*a*, 234*b*) can be in electrical connection with the heater 234 and can extend through the connector 240 so as to facilitate electrical connection with a power source. A printed circuit board (PCB) 250 or the like can be included with the vapor-forming unit 204 and may particularly be positioned within the connector 240 so as to effectively isolate the electronic component from the liquid in the annular space 247 and the vapor (and possible condensed liquid) in the flow tube 245. The PCB 250 can provide control functions for the vapor-forming unit and/or can send/receive information from a controller (see element 106 in FIG. 1) that can be in a further body to which the vapor-forming unit may be connected.

Further embodiments of a vapor-forming unit 304 are encompassed by the present disclosure in relation the example embodiment shown in FIG. 5. As seen therein, the vapor-forming unit 304 is similar in many respects to the vapor-forming unit 204 illustrated in FIG. 3. In particular, the vapor-forming unit 304 includes a housing 303 that is formed at least in part by an outer wall 305. The vapor-forming unit 304 can further comprise a connector 340 that can be positioned at a connector end 343 of the housing 303. A mouthpiece 327 can be positioned at a mouthend 330 of the housing 303.

The vapor-forming unit 304 again includes a ceramic wick 336, but the wick has a hollow interior defining an open passage 337 extending between a first end 336*a* of the wick and a second end 336*b* of the wick. The wick 336 and the open passage 337 therethrough can have a longitudinal axis that is substantially parallel to a longitudinal axis of the housing 303.

A heater 334 can be positioned within the open passage 337 of the wick 336 and can particularly be in a heating arrangement with an interior surface 336*c* of the wick. The heater 334 can be in the form of a wire coil or may take on any further arrangement suitable for heating the aerosol precursor composition transported from the annular space 347 between the flow tube 345 and the outer wall 305 of the housing 303.

The flow tube 345 in the illustrated embodiment extends from a first end 345*a* that engages the mouthpiece 327 to a second end 345*b* (i.e., a free end) that engages the second end 336*b* of the wick 336. The first end 336*a* of the wick 336 likewise engages the connector 340. In this manner, an outer surface 336*d* of the wick 336 is exposed to the annular space 347 and thus the aerosol precursor composition stored therein so that the aerosol precursor composition is passed through the wall of the wick to the heater 334 present in the hollow interior of the wick.

The wick 336 can sealingly engage one or both of the flow tube 345 and the connector 340. As shown in FIG. 5, a first sealing member 348*a* is circumferentially positioned between the wick 336 and the connector 340. Similarly, a second sealing member 348*b* is circumferentially positioned between the wick 336 and a portion of the flow tube 345 (e.g., proximate the second end 345*b* of the flow tube) The first sealing member 348*a* and the second sealing member 348*b* are spaced apart so that the outer surface 336*d* of the wick 336 is exposed therebetween.

An airflow path 357 can be present through the vapor-forming unit 204 and can be present particularly between the connector end 343 of the housing 303 and the mouthend 330 of the housing. The airflow path 357 extends at least partially through the flow tube 345. The airflow path 357, however, also can extend through additional elements of the device, such as through an internal channel 328 of the mouthpiece 327 and/or the connector 340. More particularly, the vapor-forming unit 304 can be configured so that air enters through the connector 340, passes through the open passage 337 through the wick 336, passes through the flow tube 345, and passes through the internal channel 328 of the mouthpiece 327 in sequence.

Electrical terminals (334*a*, 334*b*) can be in electrical connection with the heater 334 and can extend through the connector 340 so as to facilitate electrical connection with a power source. A printed circuit board (PCB) 350 or the like can be included with the vapor-forming unit 304 and may particularly be positioned within the connector 340 so as to effectively isolate the electronic component from the liquid in the annular space 347 and the vapor and in the wick 336. The PCB 250 can provide control functions for the vapor-forming unit and/or can send/receive information from a controller (see element 106 in FIG. 1) that can be in a further body to which the vapor-forming unit may be connected.

As seen in FIG. 1, a cartridge 104 can configured for attachment to a power unit 102 to form an aerosol delivery device 100 that is substantially rod shaped and that may particularly resemble a traditional cigarette. In some embodiments, a vapor-forming unit as described herein can be configured for combination with a power unit or power unit that is relatively larger in size. In this manner, the reservoir of the vapor-forming unit can be larger so as to retain a greater volume of aerosol precursor composition. An exemplary embodiment of a power unit 402 is shown in FIG. 6. The power unit 402 can include any or all of the elements described in relation to the power unit 102 shown in FIG. 1. In particular, the power unit 402 can include a power source at a minimum. The power unit 402 can also include a controller (e.g., a PCB including a microcontroller) and/or a sensor and/or a feedback element (e.g., a light, sound, and/or vibration producing element) and/or an input screen. A vapor-forming unit can be combined with a power unit 402 in a variety of manners. Power units of similar structure and being suitable for use according to the present disclosure are described in U.S. Pub. No. 2016/0050975; U.S. patent application Ser. No. 14/981,051, filed Dec. 28, 2015; and U.S. patent application Ser. No. 15/202,947, filed Jul. 6, 2016, which are incorporated herein by reference.

FIG. 7 shows an aerosol delivery device 500 comprising a power unit 502 and a connected vapor-forming unit 504. The vapor-forming unit 504 is generally cylindrical in form and includes a housing 503, a connector 540 forming a connection with the power unit 502, and a mouthpiece 527. As illustrated in FIG. 7, as a comparative to FIG. 1, it can be seen that the vapor-forming unit 504 is relatively larger in size and thus can contain a greater volume of aerosol precursor composition. Likewise, the power unit 502 is comparatively larger in size and thus can provide a larger power source. As such, the aerosol delivery device of FIG. 7 can provide a greater number of puffs on the device and/or a greater total mass of aerosol delivered relative to the device of FIG. 1 between charging of the power source and refilling or changing the vapor-forming unit 504.

Whereas the vapor-forming unit (204, 304, 504) can be substantially cylindrical and elongated, the unit can take on different forms in light of alterations in the internal structure thereof. For example, FIG. 8 shows an aerosol delivery device 600 comprising a power unit 602 and a connected vapor-forming unit 604, wherein the vapor-forming unit is relatively shorter and includes a side extension. As such, the overall vapor-forming unit 604 can have a lateral dimension that more closely approaches the lateral dimension of the power unit 602. For example, the overall width of the vapor-forming unit 604 can be about 50% to about 99%, about 60% to about 98%, or about 70% to about 97% of the overall width of the power unit 602.

Components of the vapor-forming unit 604 are further illustrated in FIG. 9. In the exemplified embodiment, the vapor-forming unit 604 comprises a housing 603 formed of an outer wall 605. The housing 603 includes an airflow entry 607 and an airflow exit 609. The airflow entry 607 can pass through a connector 640 that can be integrally formed in the housing 603. Alternatively, a separate connecter can be combined with the housing 603, and the airflow entry into the housing can be proximate the point of attachment of the separate connector to the housing. The airflow exit 609 can be defined by a wall that can effectively form a flow tube 645. The airflow exit 609 also can include a mouthpiece 627 extending outward from the housing 603. In the embodiment illustrated in FIG. 9, the top portion of the housing 603 is defined by a cap 670 that includes an integrally formed mouthpiece 627 and an integrally formed flow tube 645. In other embodiments, however, the cap 670, the mouthpiece 627, and the flow tube 645 may each be separate elements that are combinable; the cap 670 may be integrally formed with the mouthpiece 627 while the flow tube 645 is a separate element; the cap 670 may be integrally formed with the flow tube 645 while the mouthpiece 627 is a separate element; or the mouthpiece 627 and the flow tube 645 may be integrally formed while the cap is a separate element. If desired, the cap 670 can be integral to the housing 603. In any of the alternatives, the three elements may be combined in any manner to achieve the equivalent structure to that illustrated in FIG. 9.

The vapor-forming unit 604 as shown in the embodiment of FIG. 9 further comprises a liquid storage container 644 positioned within the housing 603. The liquid storage container 644 can be formed of a flexible outer wall 653 that has an opening 654 formed therein. The flexible outer wall 653 can be formed of a collapsible material that can retain the desired liquid volume without rupturing and that is otherwise substantially inert to the various components of the aerosol precursor composition that is stored therein. Non-limiting examples of suitable materials for forming the flexible outer wall include polyvinyl chloride (PVC), urethanes, rubberized nylon, polyethylene, polypropylene, and the like.

The opening 654 in the liquid storage container 644 can be configured for engagement with a ceramic wick 636. The wick 636 can be substantially solid meaning that although the wick may be porous, it is not hollow in the sense of having a continuous, uninterrupted channel passing through the wick from one end to the other end. In some embodiments, the wick 636 can be substantially rod-shaped. As seen in FIG. 9, the wick 636 includes an engaging end **636*a* that is at least partially inserted into the opening 654 in the liquid storage container 644. The engaging end 636*a* of the wick 636 can be retained in the opening 654 by frictional forces alone. As illustrated, a clamp 649 surrounds the outer surface of the liquid storage container 644 proximate the opening 654 to form a sealing engagement between the wick 636 and the liquid storage container. In the illustrated embodiment, the wick 636 has a longitudinal axis, and the liquid storage container 644 has a longitudinal axis, and the longitudinal axes of the wick and liquid storage container are substantially parallel. The longitudinal axes moreover can be substantially perpendicular to a longitudinal axis of the airflow path between the airflow entry 607 and the airflow exit 609 of the housing 603**.

A heater 634 is positioned at a substantially central portion **636*c* of the wick 636, which portion is positioned at least partially within the airflow path that encompasses the airflow entry 607 and the airflow exit 609. The airflow path can include the connector 640, the flow tube 645, and the mouthpiece 627. As illustrated in FIG. 9, a lower end of the flow tube 645 can substantially abut the wick 636 at the area encompassing the central portion 636*c* thereof so that substantially all of the vapor produced by the heater 634 vaporizing aerosol precursor composition passed from the liquid storage container 644 through the wick can be whisked away through the flow tube without substantially invading other areas of the vapor-forming unit 604. The wick 636 also includes a free end 636*b*, and the free end of the wick can include a lip 636*e* to provide a secure fit for the wick within the housing 603. As in further embodiments discussed above, the vapor-forming unit 604 further includes a PCB 650 and electrical terminals 634*a* and 634*b* connecting the heater 634** to a power source.

As seen in FIG. 9, the housing 603 of the vapor-forming unit 604 can be characterized as including two combined bodies. A main body **603*a* can be substantially aligned with the axis of the airflow path through the housing 603, and this main body can include the connector 640, the flow tube 645, and the mouthpiece 627. The housing 603 can also include a projection 603***b* that extends substantially perpendicularly from the main body 603*a*. This projection 603*b* can include the liquid storage container 644. The wick 636 may be aligned so that a portion of the wick is in the main body 603*a* and a portion of the wick is in the projection 603*b*.

As discussed above, the vapor-forming unit 604 can be connected to a power unit (see FIG. 8), and the power unit 602 particularly can include a power source. In some embodiments, the vapor-forming unit 604 can be connected to a power unit 602 such that the vapor-forming is external to the power unit when connected. Although a portion of the connector 640 may be internal to the power unit 602 in some embodiments, the remainder of the main body 603*a* and the extension 603*b* of the housing 603 remain external to the power unit. In other embodiments, however, the vapor-forming unit is connectable with the power unit such that the vapor-forming unit is entirely internal to the power unit when the two are connected. Such embodiment is illustrated in FIG. 10 and FIG. 11.

The vapor-forming unit 704 seen in FIG. 10 is similarly constructed as the vapor-forming unit 604 illustrated in FIG. 9. In particular, the vapor-forming unit 704 includes a housing 703 formed of an outer wall 705. The housing 703 includes an airflow entry 707 and an airflow exit 709. In some embodiments, the airflow entry 707 can be formed in a PCB 750 positioned in a notch 705*a* in a lower portion of the outer wall 705. In some embodiments, the PCB 750 may be absent, and the notch 705*a* can be sized appropriately to function as the airflow entry.

The vapor-forming unit 704 as shown in the embodiment of FIG. 10 further comprises a liquid storage container 744 positioned within the housing 703. The liquid storage container 744 can be formed of a flexible outer wall 753 that has an opening 754 formed therein. The portion of the flexible outer wall 753 proximate the opening 754 can effectively form a neck 744*a* that is sized to receive the ceramic wick 736, which can be substantially solid. Similar to the embodiment illustrated in FIG. 9, the wick 736 includes an engaging end (not visible in FIG. 10) that is at least partially inserted into the opening 754 defined by the neck 744*a* of the liquid storage container 744, and the neck 744*a* can form a seal against the wick 736 with a clamp 749.

In the illustrated embodiment, the wick 736 has a longitudinal axis, and the liquid storage container 744 has a longitudinal axis, and the longitudinal axes of the wick and liquid storage container are substantially parallel. The longitudinal axes moreover can be substantially perpendicular to a longitudinal axis of the airflow path between the airflow entry 707 and the airflow exit 709 of the housing 703.

A heater 734 is positioned at a substantially central portion 736*c* of the wick 736, which portion is positioned at least partially within the airflow path that encompasses the airflow entry 707 and the airflow exit 709. As illustrated in FIG. 10, the housing 703 can include isolating walls 705*b* and 705*c* extending inward from the outer wall 705 of the housing. The isolating walls (705*b*, 705*c*) can include notches shaped to substantially correspond to the outer contour of the wick 736. In some embodiments, more than two isolating walls may be utilized. Alternatively, only a single isolating wall 705*c* may be present. The isolating walls (705*b*, 705*c*) effectively isolate the area encompassing the central portion 736*c* of the wick 736 so that substantially all of the vapor produced by the heater 734 vaporizing aerosol precursor composition passed from the liquid storage container 744 through the wick can be whisked away through the airflow exit 709 without substantially invading other areas of the vapor-forming unit 704. The wick 736 also includes a free end 736*b*, and the free end of the wick can include a lip 736*e* to provide a secure fit for the wick within the housing 703. As illustrated, the lip 736*e* effectively secures the free end 736*b* of the wick 736 between the outer wall 705 of the housing 703 and one of the isolating walls 705*b*. The vapor-forming unit 704 is illustrated in FIG. 10 with substantially half of the outer wall 705 of the housing 703 removed to reveal the inner components of the device. The outer wall 705, in some embodiments, may be formed to two halves that are substantially mirror images thereof. The two halves that form the outer wall 705 may be glued, soldered, or otherwise combined to prevent separation and removal of the internal components of the vapor-forming unit 704. Alternatively, the two halves that form the outer wall 705 may be configured for separation so that the wick 736 and/or heater 734 and/or liquid storage container 744 may be removed and replaced (or refilled in relation to the liquid storage container).

Electrical terminals 734*a* and 734*b* connect the heater 734 to the PCB 750, which can include corresponding terminals to form an electrical connection with a power source in a power unit. To this end, the vapor-forming unit 704 can be configured for insertion into a power unit.

FIG. 11 illustrates an aerosol delivery device 700 that includes a vapor-forming unit 704 substantially as described in relation to FIG. 10 inserted into a power unit 702 through an aperture 781. The vapor-forming unit 704 may be replaceable by removal and reinsertion through the aperture 781 as shown by arrow A, of the vapor-forming unit can be a non-replaceable unit that is inserted during manufacturing with no option for removal by a user. The vapor-forming unit 704, when inserted into the power unit 702, can be at least partially internal to the power unit. In some embodiments, the vapor-forming unit 704, when inserted into the power unit 702, can be entirely internal to the power unit such that the external wall 705 forming the housing of the vapor-forming unit is entirely internal to the power unit. If desired, however, a tab 792 or similar element may be included with the vapor-forming unit 704 to facilitate removal of the vapor-forming unit in some embodiments, and at least a portion of such tab or similar element may be positioned external to the power unit 702 while the housing of the vapor-forming unit is still entirely internal to the power unit 702.

The power unit 702 can include electrical connectors 783*a*, 783*b* aligned with the vapor-forming unit 704 to deliver electrical power to the electrical terminals 734*a*, 734*b* (e.g., directly or through intermediate connectors on the PCB 750) from a power source 710 in the power unit. The power unit 702 further can include a control component 706, which can be in the form of a PCB including appropriate microcontroller functions. A sensor 708 can be included in the power unit 702 and can be in fluid communication with an air inlet 785 through which air can be drawn from the atmosphere, through the power unit 702, and into the airflow entry 707 of the vapor-forming unit 704. The sensor 708 sensing the airflow can activate the power source 710 for power delivery to the heater 734 in the vapor-forming unit 704. The sensor 708 may be combined with the controller 706.

The power unit 702 of the aerosol delivery device 700 can include a mouthpiece 727. An aerosol entry 787 can be formed in the power unit 702 above the airflow exit 709 of the vapor-forming unit 704. Thus, when the vapor-forming unit 704 is inserted into the power unit 702, the airflow exit 709 of the housing 703 is substantially aligned with the aerosol entry 787. In use, aerosol precursor composition from the liquid storage container 744 passes through the ceramic wick 736 to the heater 734 where it is vaporized and mixed with air passing through the air inlet 785 and the airflow entry 707 to form an aerosol that passes out of the airflow exit 709 and into the aerosol entry 787. From the aerosol entry 787, the formed aerosol passes through a hollow interior 727*a* of the mouthpiece 727 to exit the mouthend 727*b* of the mouthpiece.

The mouthpiece 727 of the aerosol delivery device 700 can be stationary. In some embodiments, the mouthpiece 727 can be movable between an open position (as illustrated in FIG. 11) wherein formed aerosol may pass through the hollow interior 727*a* to the mouthend 727*b* of the mouthpiece and a closed position wherein formed aerosol is substantially prevented from passage therethrough. Preferably, the aerosol delivery device 700 can be configured to include a switch 789 so that when the mouthpiece 727 is not in position to allow passage of aerosol therethrough, the aerosol delivery device can be prevented from operation. In the illustrated embodiment, the mouthpiece 727 is foldable and is thus configured to pivot about a central hub 727*c* to be folded substantially flat against the power unit 702 to be in a closed position and the unfold to an extended position for use. The folding action can substantially seal the aerosol entry 787 from the hollow interior 727*c* of the mouthpiece, and the folding action can activate the switch 789, if desired. In the illustrated embodiment of FIG. 11, the power unit 702 includes a receptacle 791 into which the mouthpiece 727 can substantially recess and which can be configured to substantially cover the mouthend 727*b* of the mouthpiece to prevent contamination thereof when not in use.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device comprising:
- a housing extending between a mouthend and a connector end;
- a mouthpiece at the mouthend of the housing;
- a connector at the connector end of the housing;
- a flow tube arranged within the housing;
- a reservoir for an aerosol precursor composition defined between the flow tube and the housing; and
- an atomizer comprising a liquid transport element that is formed of a porous ceramic and a heating element, wherein the liquid transport element extends between a first end and a second end and has a hollow interior that defines an open passage that extends between the first end and the second end of the liquid transport element, and wherein the heating element is positioned at least partially within the open passage of the liquid transport element;
- wherein the liquid transport element sealingly engages the flow tube and at least a portion of the liquid transport element is received through at least a portion of the flow tube so as to be within the flow tube, such that the open passage defined by the hollow interior of the liquid transport element aligns with a path extending through the flow tube.

2. The aerosol delivery device of claim 1, wherein the flow tube extends between a first end that engages the mouthpiece and a second end through which the at least the portion of the liquid transport element is received.

3. The aerosol delivery device of claim 1, wherein the first end of the flow tube has a first transverse dimension, and the second end of the flow tube has a second transverse dimension that is greater than the first transverse dimension.

4. The aerosol delivery device of claim 3, wherein the second transverse dimension of the second end of the flow tube is sized for receiving the at least the portion of the liquid transport element.

5. The aerosol delivery device of claim 3, wherein the second transverse dimension of the second end of the flow tube is sized for receiving the at least the portion of the liquid transport element and also for receiving at least one further component of the aerosol delivery device.

6. The aerosol delivery device of claim 2, wherein the liquid transport element and the flow tube are arranged relative to one another such that, when the at least the portion of the liquid transport element is received within the flow tube, the aerosol precursor composition from the reservoir passes to the liquid transport element but is substantially prevented from entering the flow tube between the liquid transport element and the first end of the flow tube.

7. The aerosol delivery device of claim 2, further comprising at least one sealing member positioned between the liquid transport element and the flow tube.

8. The aerosol delivery device of claim 1, wherein the flow tube extends fully between the mouthpiece and the connector.

9. The aerosol delivery device of claim 1, wherein the flow tube comprises one or more openings formed in an outer wall defining the flow tube.

10. The aerosol delivery device of claim 1, wherein the open passage of the liquid transport element is defined by an interior surface of the porous ceramic.

11. The aerosol delivery device of claim 10, wherein the heating element is in a heating arrangement with the interior surface of the porous ceramic.

12. The aerosol delivery device of claim 1, wherein the heating element is configured as a wire coil.

13. The aerosol delivery device of claim 1, wherein the flow tube is formed of metal.

14. The aerosol delivery device of claim 1, wherein the open passage that extends between the first end and the second end of the liquid transport element has a longitudinal axis that is substantially parallel to a longitudinal axis of the housing.

15. The aerosol delivery device of claim 1, wherein the liquid transport element further sealingly engages the connector.

16. The aerosol delivery device of claim 1, wherein the liquid transport element is at least partially positioned within the connector.

17. The aerosol delivery device of claim 1, wherein the at least the portion of the liquid transport element received through the flow tube is surrounded by the flow tube and at least a second portion of the liquid transport element is surrounded by at least a portion of the connector.

* * * * *